United States Patent
Liu et al.

(10) Patent No.: US 9,678,883 B2
(45) Date of Patent: *Jun. 13, 2017

(54) SYSTEM AND METHOD FOR DETECTING FALSE SHARING

(71) Applicant: Futurewei Technologies, Inc., Plano, TX (US)

(72) Inventors: Tongping Liu, Amherst, MA (US); Chen Tian, Union City, CA (US); Ziang Hu, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 208 days.

This patent is subject to a terminal disclaimer.

(21) Appl. No.: 14/335,621

(22) Filed: Jul. 18, 2014

(65) Prior Publication Data
US 2015/0032973 A1   Jan. 29, 2015

Related U.S. Application Data

(60) Provisional application No. 61/858,824, filed on Jul. 26, 2013.

(51) Int. Cl.
*G06F 12/08* (2016.01)
*G06F 12/0891* (2016.01)

(52) U.S. Cl.
CPC ................... *G06F 12/0891* (2013.01)

(58) Field of Classification Search
CPC ............. G06F 2212/62; G06F 11/3466; G06F 11/079; G06F 11/0793; G06F 11/1407; G06F 2201/885; G06F 11/0724; G06F 11/3447; G06F 12/0806; G06F 12/084; G06F 12/0842; G06F 12/0802; G06F 12/0891

See application file for complete search history.

(56) References Cited

U.S. PATENT DOCUMENTS

| 8,359,291 | B2 | 1/2013 | Dayan et al. | |
|---|---|---|---|---|
| 2011/0283152 | A1* | 11/2011 | Citron | G06F 11/3404 714/45 |
| 2012/0089785 | A1* | 4/2012 | Cho | G06F 9/52 711/141 |

(Continued)

FOREIGN PATENT DOCUMENTS

| CN | 102439567 A | 5/2012 |
|---|---|---|
| CN | 102681948 A | 9/2012 |
| EP | 2439646 A1 | 4/2012 |

OTHER PUBLICATIONS

"Instumentation," Wikipedia, downloaded Jul. 17, 2013, 7 pgs.

(Continued)

*Primary Examiner* — Zhuo Li
(74) *Attorney, Agent, or Firm* — Slater Matsil, LLP

(57) ABSTRACT

In one embodiment, a method for detecting false sharing includes running code on a plurality of cores, where the code includes instrumentation and tracking cache invalidations in the code while running the code to produce tracked invalidations in accordance with the instrumentation, where tracking the cache invalidations includes tracking cache accesses to a plurality of cache lines by a plurality of tasks. The method also includes reporting false sharing in accordance with the tracked invalidations to produce a false sharing report.

20 Claims, 13 Drawing Sheets

(56) References Cited

U.S. PATENT DOCUMENTS

2012/0210073 A1   8/2012  Eichenberger et al.
2015/0032971 A1*  1/2015  Tian ................... G06F 12/0842
                                                      711/141

OTHER PUBLICATIONS

"Intel Performance Tuning Utility 4.0 Update 5," Intel Developer Zone, downloaded Jul. 17, 2013, 5 pgs.
Guenther, S., et al., "Assessing Cache False Sharing Effects by Dynamic Binary Instrumentation," WBIA 2009, Dec. 12, 2009, 8 pgs.
PCT International Search Report and Written Opinion, International Application No. PCT/CN2014/083096, Applicant: Huawei Technologies, Co., Ltd., dated Nov. 4, 2014, 11 pgs.
Liu, C., "False Sharing Analysis for Multithreaded Programs," Master Thesis, National Chung Cheng University, Jul. 2009, 64 pgs.
Liu, T., et al., "SHERIFF: Precise Detection and Automatic Mitigation of False Sharing," OOPSLA 2011, Oct. 22-27, 2011, 15 pgs.
Schindewolf, M., et al., "A Generic Tool Supporting Cache Design and Optimisation on Shared Memory Systems," University of Edinburgh, United Kingdom, Feb. 2008, 11 pgs.
Zhao, Q., et al., "Dynamic Cache Contention Detection in Multi-Threaded Applications," VEE 2011, Mar. 9-11, 2011, 11 pgs.

* cited by examiner

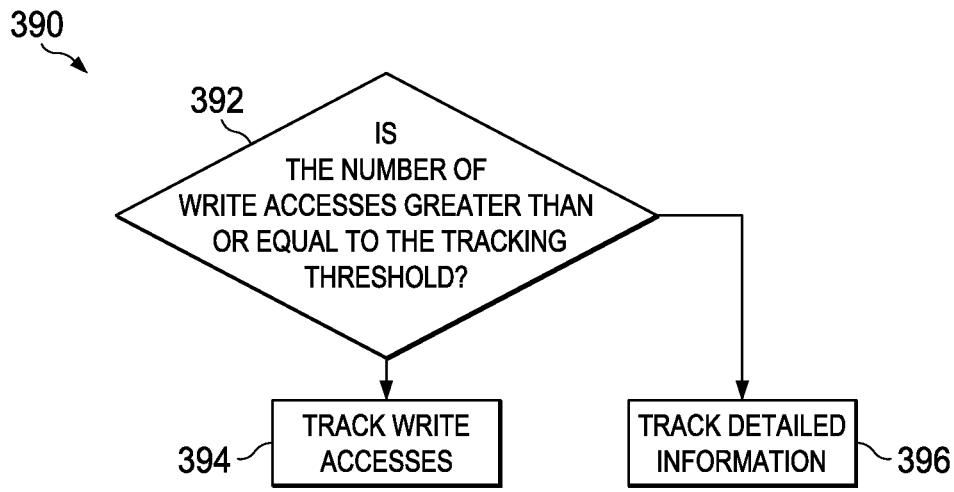

FIG. 15

```
void HandleAccess (unsigned long addr, bool isWrite) [
  unsigned long cacheIndex=addr>>CACHELINE_SIZE_SHIFTS;
  cachetrack *track=NULL;

if (CacheWrites[cacheIndex] <TRACKING_THRESHOLD) [
    if (isWrite) (
      if (ATOMIC_INCR (&CacheWrites [cacheIndex] )
         ==TRACKING_THRESHOLD-1) [
      track=allocCacheTrack () ;
      ATOMIC_CAS(&CacheTracking[cacheIndex], 0, track) );
      ]
    ]
  ]
  else (
    track=CacheTracking[index] ) ;
    if (track) (
      // Track cache invalidations and detailed accesses
      track->handleAccess(addr,  isWrite) ;
    ]
  ]
]
```

FIG. 16

SYSTEM AND METHOD FOR DETECTING FALSE SHARING

This application claims the benefit of U.S. Provisional Application Ser. No. 61/858,824 filed on Jul. 26, 2013, and entitled "System and Method for Detecting False Sharing," which application is hereby incorporated herein by reference.

TECHNICAL FIELD

The present invention relates to a system and method for multithreading, and, in particular, to a system and method for detecting false sharing.

BACKGROUND

Multithreading on multiple cores is often used in computing. Multiple cores are used in a variety of devices, including smart phones, tablets, laptops, workstations, supercomputers, and data centers. Multithreading is a programming and execution model which utilizes the underlying hardware resources by running different threads on different hardware cores concurrently. These threads may share data, files, and input/output (I/O) in order to facilitate cooperatively completing a specified task.

One challenge in multithreading is false sharing, which is related to cache usage. Cache, which is accessed much faster than main memory, is used by central processing units (CPUs) to accelerate program executions. Before accesses, the CPU checks whether the data to be accessed is in the cache. When the data is already stored in the cache, the CPU directly accesses the data from the cache, reducing access latency by avoiding accessing the slower main memory. When the data is not already stored in the cache, the CPU automatically fetches the data to the cache from the main memory in blocks of a fixed size, referred to as cache lines.

In an example multicore system, the cores have their own private caches. Thus, data accessed by threads running on different cores may be duplicated in caches of those involved cores. A cache coherence protocol is invoked to facilitate correct accesses from different threads concurrently. When the data of a cache line in one core has been changed, the cache coherence protocol invalidates other copies of the same cache line in other cores so changes made by one core are seen by the other cores.

This cache line level coherency creates a false sharing problem. When threads running on different cores access different locations in the same cache line, every write by one core on the cache line invalidates the cache line copies on the other core. As a result, frequent cache line invalidation may degrade performance, because other cores with their cache entries invalidated have to re-fetch the data from the main memory, using CPU time and memory bandwidth. Also, false sharing may further degrade performance when a system has more cores or a larger cache line size.

SUMMARY

An embodiment method for detecting false sharing includes running code on a plurality of cores, where the code includes instrumentation and tracking cache invalidations in the code while running the code to produce tracked invalidations in accordance with the instrumentation, where tracking the cache invalidations includes tracking cache accesses to a plurality of cache lines by a plurality of tasks. The method also includes reporting false sharing in accordance with the tracked invalidations to produce a false sharing report.

Another embodiment method of false sharing detection includes performing a plurality of optimization passes on source code and receiving selection criteria. The method also includes adding instrumentation to the source code after performing the plurality of optimization passes to produce an instrumented code, where the instrumentation is configured to track memory access addresses and access types of global variables and heap variables in accordance with the selection criteria.

An embodiment computer includes a first processor and a second processor. The computer also includes a non-transitory computer readable storage medium storing programming for execution by the first processor and the second processor, where the programming includes instrumentation, the programming including instructions to track cache invalidations in the programming while running the programming to produce tracked invalidations in accordance with the instrumentation, where the instructions to track the cache invalidations includes instructions to track cache accesses to a plurality of cache lines by a plurality of tasks, and report false sharing in accordance with the tracked invalidations to produce a false sharing report.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 15 illustrates a flowchart for an embodiment method of threshold based invalidation tracking;

FIG. 16 illustrates embodiment pseudocode for invalidation tracking;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment a predictive software-based false sharing detector is used. An embodiment tracks accesses within virtual cache lines, which are contiguous memory ranges spanning actual hardware cache lines, to predict false sharing on hardware platforms. A runtime system is combined with compiler instrumentation to track cache invalidations. The compiler instruments memory accesses so the runtime system is notified when an access is executed. The runtime system collects and analyzes actual memory accesses to detect and report false sharing. A user may adjust instrumentation granularity based on performance requirements. There may be a tradeoff between performance and precision of detection. False positives may be located with compiler based instrumentation. Byte and word changes are differentiated at the compiler. An embodiment is independent of thread libraries. For example, it may be applied to portable operating system interface (POSIX) threads (pthreads), message passing interface (MPI), open multi-processing (OpenMP), and other threading libraries. A threshold invoked tracking mechanism may be used to reduce the memory overhead. An embodiment algorithm captures cache invalidations based on read and write accesses of a cache line.

Figure 1:
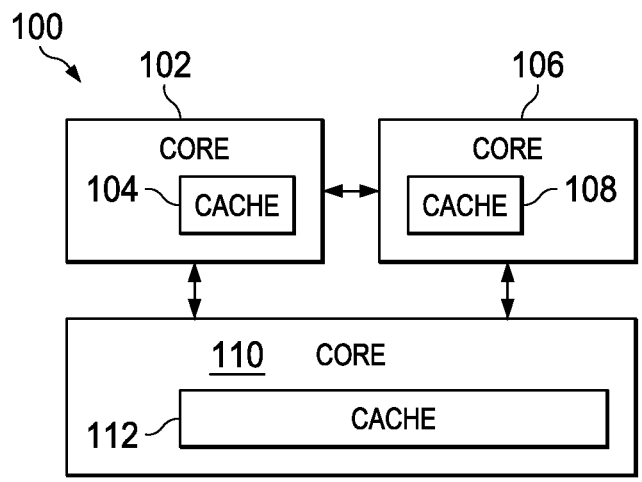
FIG. 1 illustrates an embodiment multicore system.

Multithreading in multicore systems increases the processing speed. FIG. 1 illustrates multicore system 100 containing three cores, core 102, core 106, and core 110. The cores may communicate with each other in performing computations. Separate tasks are performed on the different cores. The cores have their own cache. For example, core 102 has cache 104, core 106 has cache 108, and core 110 has cache 112. Three cores are pictured, but fewer or more cores may be used (e.g., 2, 4, 8, etc.). When a core accesses data, it examines its cache to determine whether the data is already stored in its cache. When the data is already in the cache, the core reads the data from the cache. However, when the data is not already in the cache, the core downloads the data from main memory to the cache, and then accesses the data.

Figure 2:
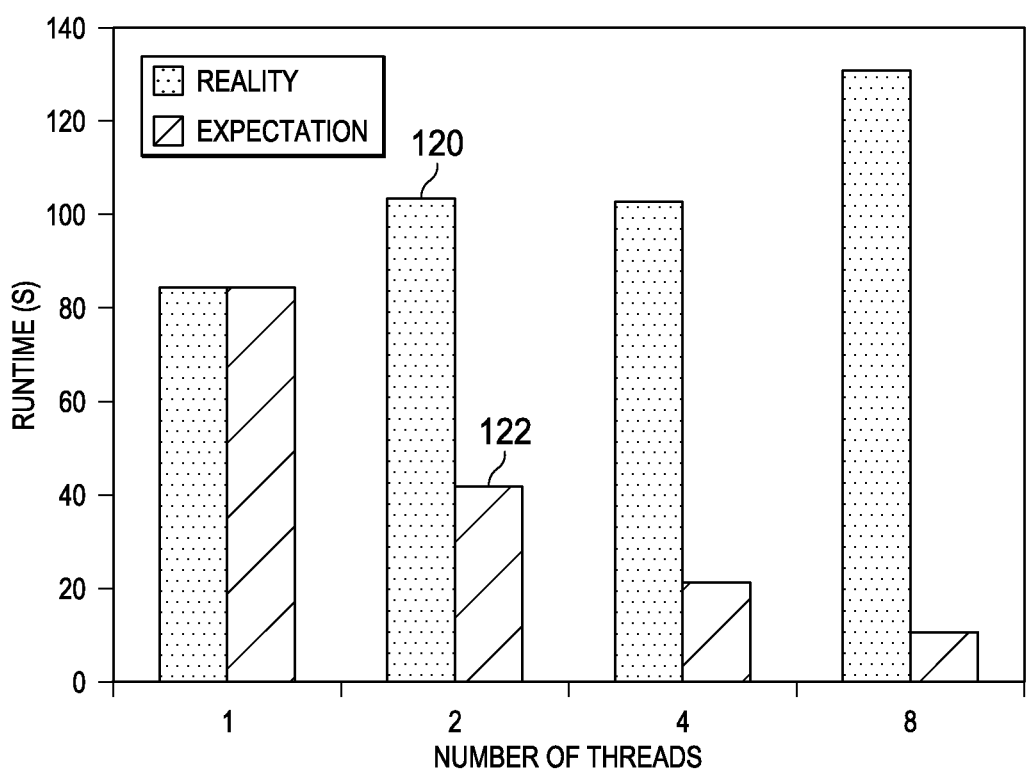
FIG. 2 illustrates a graph of runtime versus the number of threads in a multicore system.

It is desirable to have more threads to reduce the runtime. However, because of multithreading issues, such as false sharing, the runtime does not increase rapidly. FIG. 2 illustrates a graph of actual runtime 120 and expected runtime 122 based on the number of threads. False sharing slows the program by 13 times with 8 threads.

False sharing may occur due to code. For example, software which leads to false sharing is:

```
int count[8]
int W;
void increments(int S)
{
    for(in=S; in<S+W; in++)
        for(j=0; j<1M; j++)
            count[in]++;
}
int main(int THREADS) {
    W=8/THREADS;
    for(i=0; i<8; i+=W)
        spawn(increment,i);
```

Figure 3:
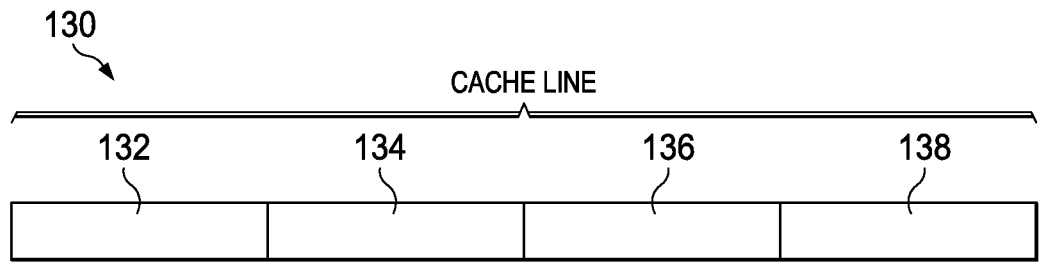
FIG. 3 illustrates a cache line.
Figure 4:
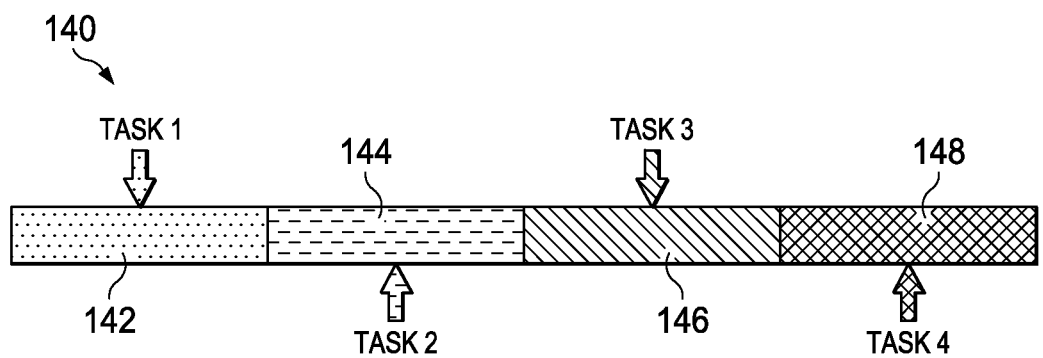
FIG. 4 illustrates false sharing in a cache line.
Figure 5:
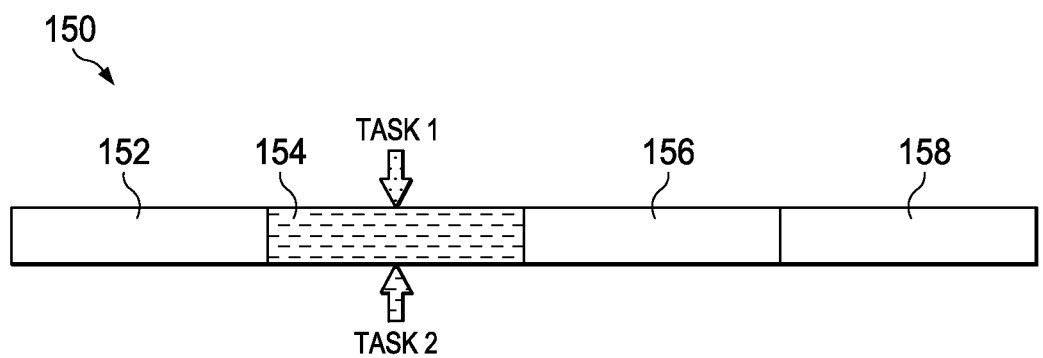
FIG. 5 illustrates true sharing in a cache line.

FIG. 3 illustrates cache line 130 with cache words 132, 134, 136, and 138. In one example, a cache line has 64 bytes and 8 words of 8 bytes. False sharing occurs when different threads update or access different words in the same cache line. FIG. 4 illustrates an example of false sharing. Task 1 accesses word 142 in cache line 140, task 2 accesses word 144 in cache line 140, task 3 accesses word 146 in cache line 140, and task 4 accesses word 148 in cache line. In true sharing, different threads update or access the same word in the same cache line. FIG. 5 illustrates an example of true sharing. Task 1 and task 2 both access word 154 in cache line 150, which also includes words 152, 156, and 158. False share degrades performance, while true sharing does not. For example, false sharing slows MySQL™ by 50%.

Figure 6A:
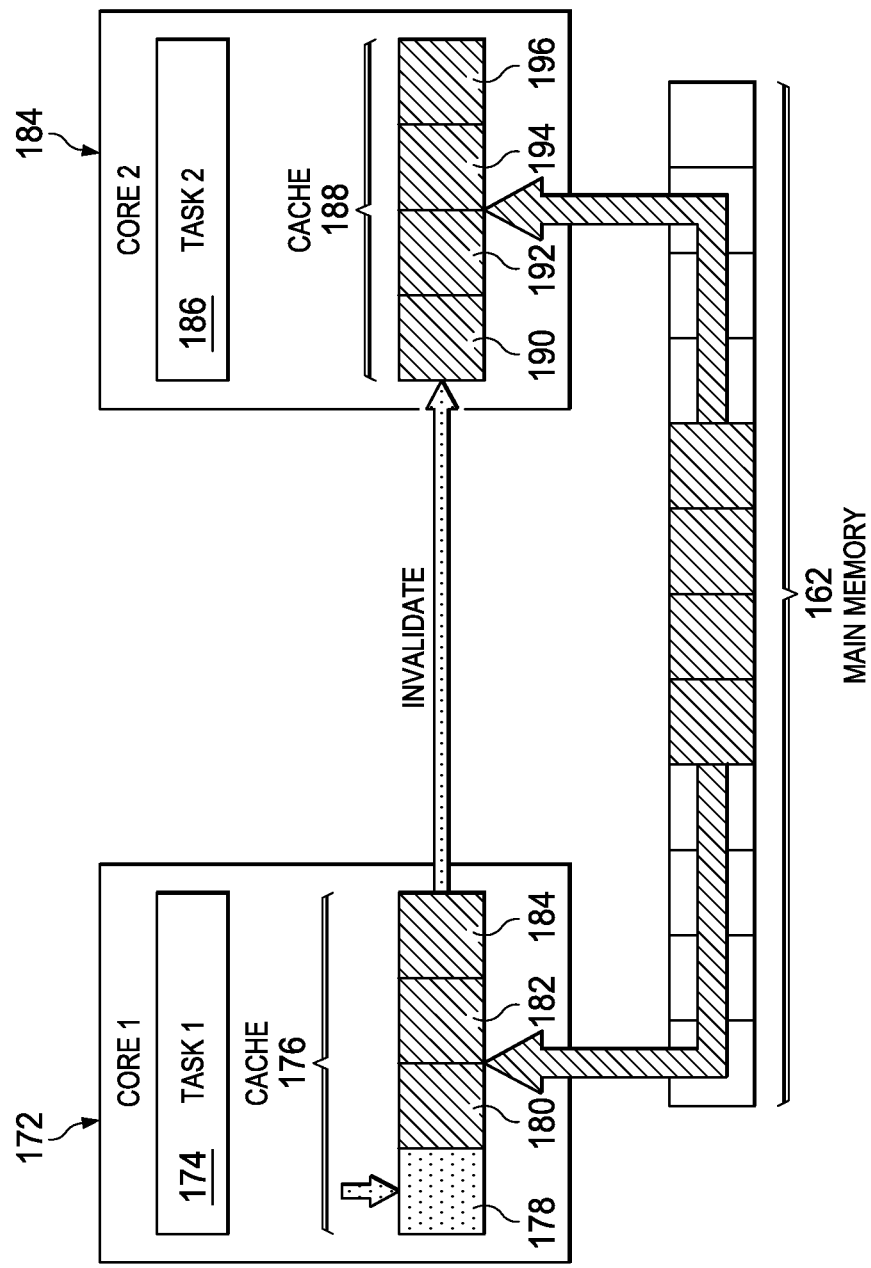
FIGS. 6A-B illustrate cache invalidation in multiple cores.
Figure 6B:
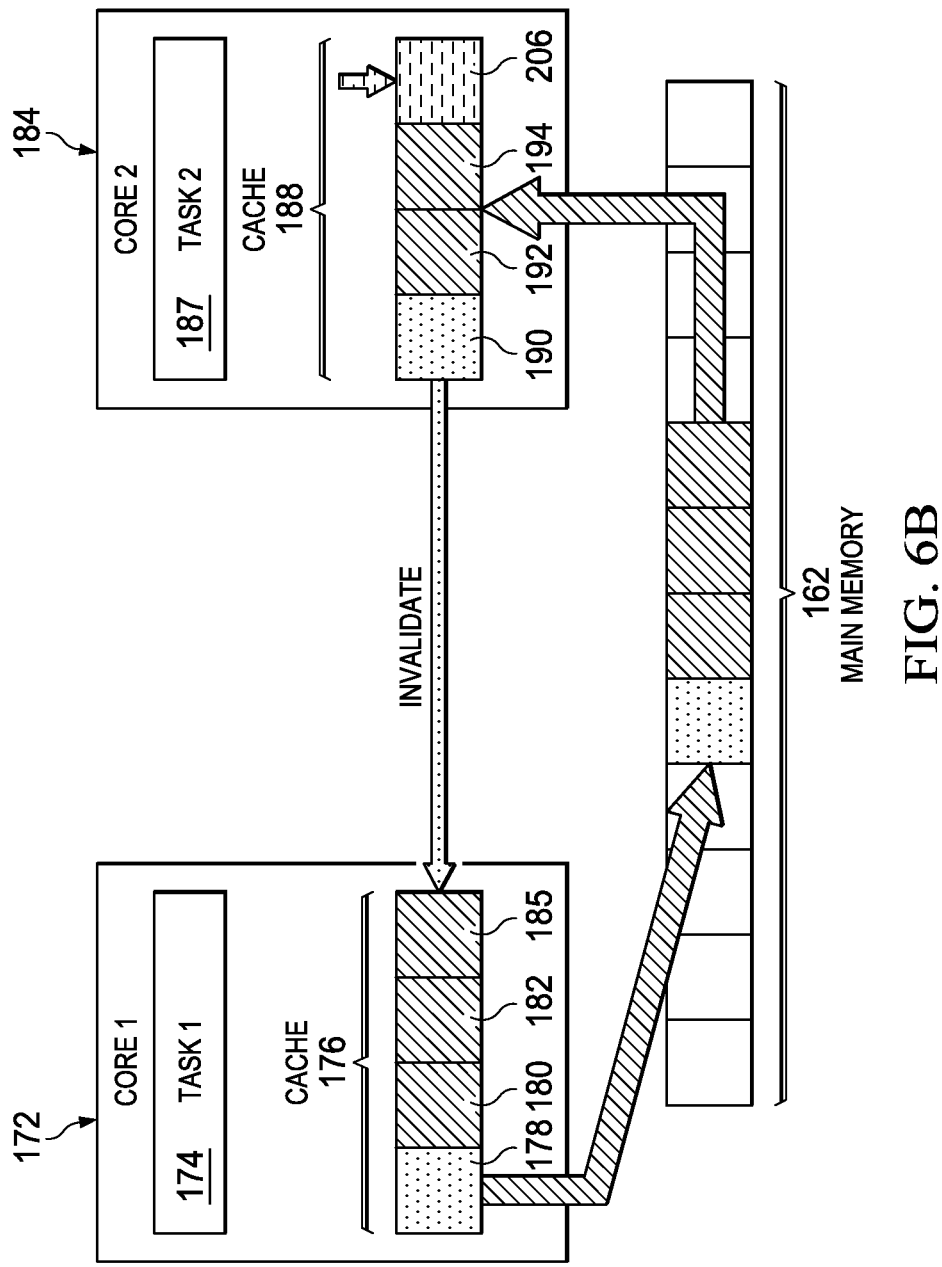

FIGS. 6A-B illustrate an example false sharing with two threads. Task 174 runs on core 172 and task 186 runs on core 184. Core 172 has its own cache, with cache line 176 having words 178, 180, 182, and 185. Likewise, core 184 has its own cache, with cache line 188 having words 190, 192, 194, and 196. Cache may be located in the same chip as the processor, and has higher access speeds than the main memory, such as main memory 162. When data is fetched to the cache from the main memory, it is fetched in units of cache lines. For example, a cache line may be 32 bytes, 64 bytes, 128 bytes or another number of bytes. The use of cache lines may reduce the number of fetches.

However, cache lines may cause performance problems when there is false sharing. Different cache coherence protocols handle updates differently. Examples of cache protocols used for cache invalidation include modified shared invalid (MSI) protocol and modified exclusive shared invalid (MESI) protocol. In the MSI protocol, the cache lines may have three possible states: modified, shared, or invalid. In the modified state, the block has been modified in the cache, and the data in the cache is inconsistent with that in the main memory. A cache line with a modified state has the responsibility to write the block to the main memory when it is evicted. In a shared state, the cache line is unmodified and exists in at least one cache. The cache in the shared state may evict the data without writing it to the main memory. In the invalid state, the cache line is invalid, and should be fetched from memory or another cache. In the MESI protocol, cache lines may be modified, exclusive, shared, or invalid. When a cache line is exclusive, the cache line is present only in the current cache, but it matches the main memory. In one example, the state is changed to shared in response to a read request. Alternatively, it is changed to modified when written to. In both protocols, when a cache line is written to, it goes to the invalidate state. For example, task 174 writes to word 178 in cache line 176. Core 184 has a copy of the same data in its cache. The data is invalidated to ensure correct data for the case of true sharing. However, invalidation is unnecessary for false sharing.

When task 2 access data in cache line 188, for example in FIG. 6B, task 187 fetches the data from core 172. Likewise, when task 186 modifies word 206 in cache line 188, the data in core 172 is invalidated, and is read from the main memory. When there are many interleaved writes from different threads, there may be many cache invalidations. The large number of cache invalidations may cause serious performance problems. As the number of cores increases or the cache line size increases, false sharing becomes more problematic.

False sharing occurs in a variety of situations. For example, false sharing may occur on struct fields, two different global variables, two different heap objects, two different fields of the same structure, or two different elements of the same array. Some situations which may lead to false sharing include:

```
me = 1;
you = 1; // globals
me = new Foo;
you - new Bar; // heap
class X {
    int me;
    int you;
}; // fields
array[me] = 12;
array[you] = 13; // array indices
```

False positives occur in runtime, and are not visible from the source code.

Figure 7:
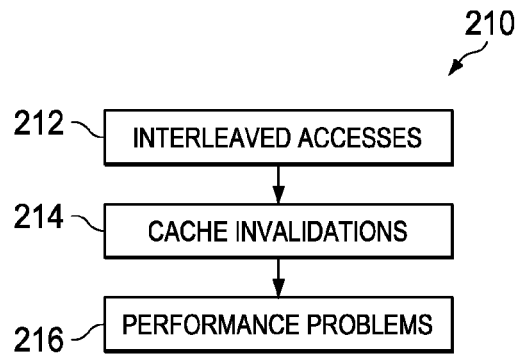
FIG. 7 illustrates interleaved access leading to performance problems.

False sharing may causes performance problems. FIG. 7 illustrates flowchart 210 indicating how false sharing causes performance problems. In step 212, interleaved access causes cache invalidations 214. These cache invalidations cause performance problems 216.

In one example, physical addresses for the false sharing are reported, which involves a large overhead. In another example, a false sharing miss ratio is reported, which also involves a large overhead. In an additional example, the cache miss ratio and cache invalidation ratio are reported, which does not pinpoint the exact cause of the false sharing. In another example, a binary instrumentation tool is used, which does not access the source code, but introduces a high performance overhead, because every instruction is intercepted and interpreted online. Also, this approach does not report detailed information about false sharing on the binary level. Alternatively, a binary instrumentation technique intercepts every memory read and write access, which also has a high overhead of about 100 times. In another example, Valgrind is used to track the sequence of memory accesses and report the worst case estimation of false sharing, which has an extremely high overhead of about 200 times.

In a simulation approach, a simulation simulates the execution of a program and finds cache misses. The simulation approach may be slow, and also may rely on the correctness of the simulation tool. The exact hardware arguments may be used.

In an example, a performance tuning utility (PTU) points out functions, but may not pinpoint objects with false sharing problems. PTU uses specialized hardware, for example precise event based sampling (PEBS) registers. PTU only runs on special hardware, and does not extend to other hardware, such as computers or mobile devices using ARM architecture. Also, PTU may report many false positives caused by true sharing, heap object re-usage, and non-interleaved false sharing.

In another example, Sheriff uses a processes-as-threads framework. Sheriff tracks memory modification of different threads by using memory protection and a twinning-and-diffing mechanism. Sheriff turns threads into processes to utilize the memory protection mechanism of multiple processes to capture writes from different threads. To determine which false sharing instances actually cause performance problems, Sheriff captures interleaved writes from different threads and ranks the seriousness of the false sharing problems based on the rating. Sheriff detects write-write false sharing for applications using pthreads without self-defined synchronizations. Also, Sheriff may not perform ad hoc synchronization using a stack for communication.

An embodiment method of detecting false sharing leverages the compiler to selectively instrument memory accesses by inserting callback functions provided by a runtime library. The callback functions assist the runtime system in capturing or collecting the actual memory read/write information for an application. Based on the runtime information, whether false sharing poses a problem is detected. Both write-write false staring and read-write false sharing may be detected. Also an embodiment may detect scalability problems in software caused by false sharing.

Figure 8:
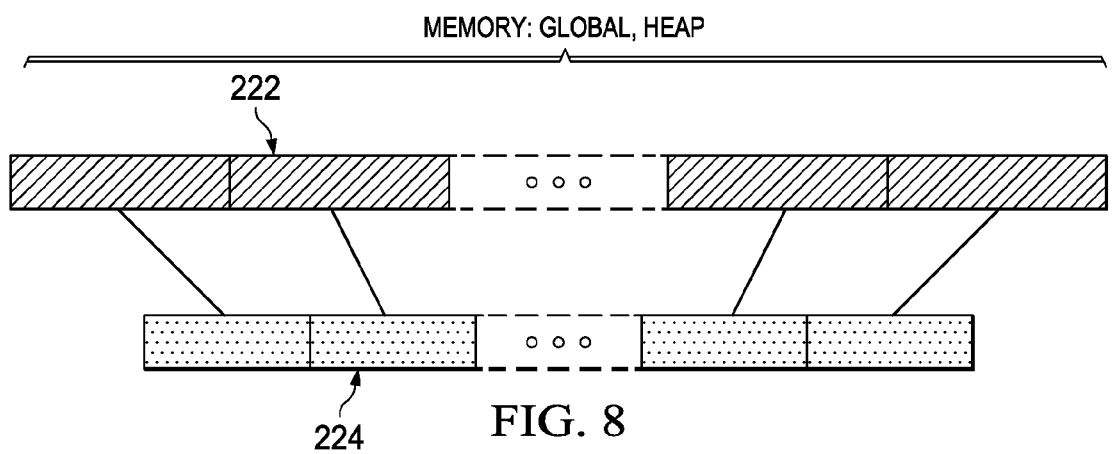
FIG. 8 illustrates tracking of cache lines.

To detect false sharing, cache lines with many cache invalidations may be detected. FIG. 8 contains memory 222, which may contain global variables, heaps, etc. Status words 224 track cache lines in memory 222. When memory is accessed from a thread, information related cache invalidations are updated. Objects involved in cache lines with a large number of cache invalidations are updated.

Figure 9:
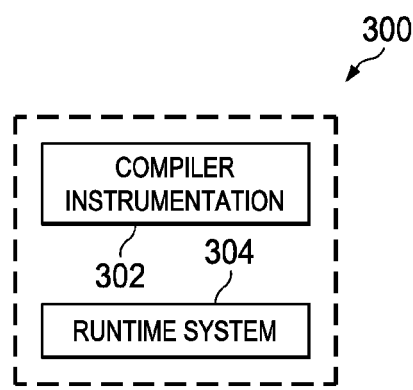
FIG. 9 illustrates an embodiment system for false sharing detection.

An embodiment is referred to as predator. System 300 illustrated by FIG. 9 includes compiler instrumentation 302 and runtime system 304. The compiler instrumentation is inserted into the source code to track memory read and write accesses. When there is a memory access, the runtime system is notified, for example using a library call. The runtime system collects memory accesses, updates corresponding invalidations, and reports false sharing. The callsites of the memory allocations are saved. Graphing memory access helps separate false sharing from true sharing.

A compiler may capture instructions accessing global variables and heap objects. Other information, such as when those instruments are being executed or how many times a variable or pointer is accessed, is not determined during the compiling phase, because this information depends on the input parameter or execution environment. Such dynamic information is used to detect false sharing. The runtime system captures when instructions are executed and how many times a variable or a pointer is accessed. An embodiment combines a runtime system and compiler instrumentation to provide detailed information to detect false sharing in applications.

In an embodiment, a compiler selectively instruments read and write accesses of global variables and pointers. Instrumentation refers to using the compiler to insert function callbacks into the source code, for example when the application invokes read and write accesses on global variables or heap variables. Callback functions facilitate the runtime system collecting memory read and write information. Thus, an embodiment detects false sharing problems.

Figure 10:
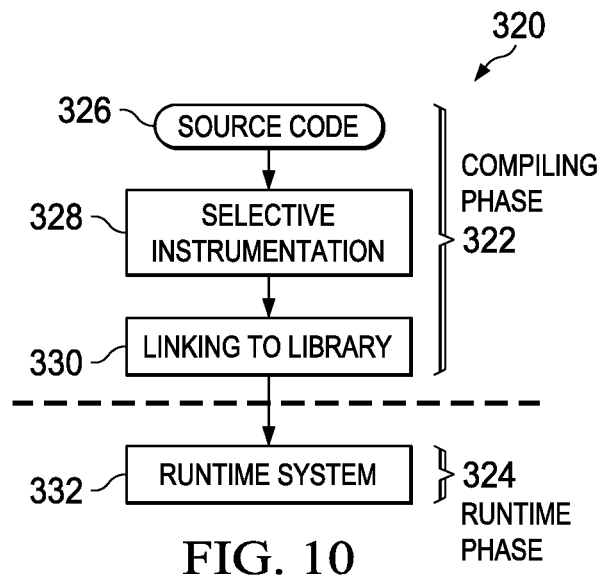
FIG. 10 illustrates another embodiment system for false sharing detection.

FIG. 10 illustrates flowchart 320 for a method of detecting false sharing. Flowchart 320 includes compiling phase 322 and runtime phase 324. Compiling phase 322 includes source code 326, selective instrumentation 328, and linking library 330, while runtime phase 324 includes runtime system 332. Source code 326 is the source code where false sharing is to be avoided. Selective instrumentation 328 instruments source code 326 in a flexible fashion, so read and write accesses to the memory are provided to the runtime system. Selective instrumentation reduces performance overhead. This flexibility may be facilitated by making different decisions based on the access type, sampling target, and sampling optimization at different levels. Then, instrumentation is linked to a library in linking to library 330.

In one example, only write accesses are instrumented to detect write-write false sharing. Alternatively, both read and write accesses are instrumented to detect read-write false sharing problems as well as write-write false sharing problems. In read-write false sharing, one thread is writing to a cache line while other threads are reading from the same cache line.

Different sampling targets may be chosen, for example based on user input. In one example, all functions inside all modules are sampled. This leads to the runtime system obtaining all memory read and write information about the variables and objects at the expense of more performance overhead. In another example, a user provides a black list for some modules, functions, or variables not to be instrumented. The compiler skips instrumentation on the black listed items, which reduces the performance overhead from instrumentation. In another example, a user provides a red list for modules, functions, or valuables to be instrumented. The compiler selectively instruments the red listed items to reduce the performance overhead from the instrumentation. Different sampling targets may be selected to provide reasonable performance overhead. There is a tradeoff between performance and accuracy.

Sampling optimization may be performed on different levels. At the basic block level, sampling is selected once for multiple accesses to the same address. The compiler informs the runtime system how many accesses happen in the first basic block. Thus, the correct number of memory accesses in one basic block may be obtained if there is no flow switch inside the basic block. The sampling overhead may be thus reduced.

Because the compiler is leveraged for instrumentation, very fine grained information about every access may be obtained. For example, whether the access is to a specific word, byte, or bit may be determined. This information may be used to precisely locate false sharing in the reporting phase.

Runtime system 332 detects false sharing. Cache line invalidation is a root cause for performance degradation, because cache invalidations waste both CPU time and memory bandwidth. Therefore, an embodiment searches for the memory accesses which may introduce a large amount of cache line invalidation.

When a thread writes to a cache line immediately after other threads have accessed the same cache line, the write operation is likely to cause at least one cache invalidation. An embodiment data structure and method detects cache invalidations caused by interleaved access.

Instrumentation provides memory access information to the runtime system, which detects false sharing based on the sequence of memory accesses on the cache lines. The performance overhead of a specific program is proportional to the degree of instrumentation. More instrumentation leads to more performance overview.

In one embodiment, instrumentation is added once per type of memory access on addresses to the same basic block. This selective instrumentation may not affect the effectiveness of detection. Less tracking of accesses inside a basic block may induce fewer cache invalidations without impacting the overall behavior of cache invalidations.

Instrumentation may be dynamic instrumentation or compiler implementations. Dynamic instrumentation approaches may analyze the program's code before the execution to insert instrumentation. This introduces significant performance overhead, for example caused by run-time encoding and decoding, but provides good generality, because recompilation is not used. Compiler instrumentation inserts instrumentation during the compilation phase, which may have less generality.

Figure 11:
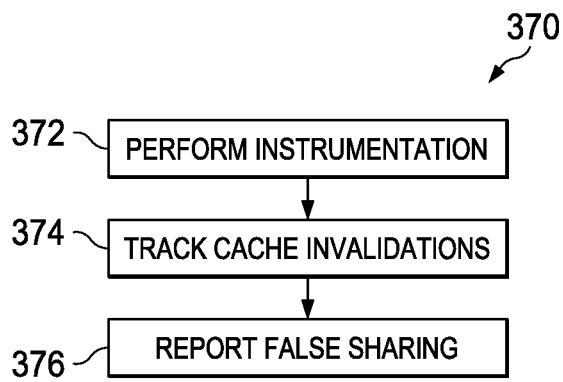
FIG. 11 illustrates a flowchart for an embodiment method of false sharing detection.

FIG. 11 illustrates flowchart 370 for a method of detecting false sharing. Initially, in step 372, instrumentation is performed in the compiler phase. An embodiment compiler uses low level virtual machine (LLVM) to perform instrumentation at the intermediate representation level. The compiler traverses functions one by one, searching for memory accesses, for example to global and heap variables. For memory accesses, a function is instrumented to invoke the runtime system with the memory access address and access type, read access or write access. In one example, accesses to stack variables is omitted, because stack variables may be used for local storage. Alternatively, accesses to stack variables are instrumented. In an example, the instrumentation is placed at the end of the LLVM optimization passes, so only memory accesses surviving previous LLVM optimization passes are instrumented.

Then, in step 374, cache invalidations are tracked. This is performed by the runtime system. The runtime system collects memory accesses by handling those function calls inserted during the compiler instrumentation phase. The cache invalidations are analyzed to determine whether they constitute false sharing.

Finally, in step 376, false sharing is reported. For global variables involved in false sharing, the name, address, and size are reported. For heap objects, the callsite stack for their allocations, their address, and size are reported. Also, the word granularity access information for cache lines involved in false sharing, including which threads accessed which words, may be shared. This information may assist in diagnosing and fixing false sharing.

Figure 12:
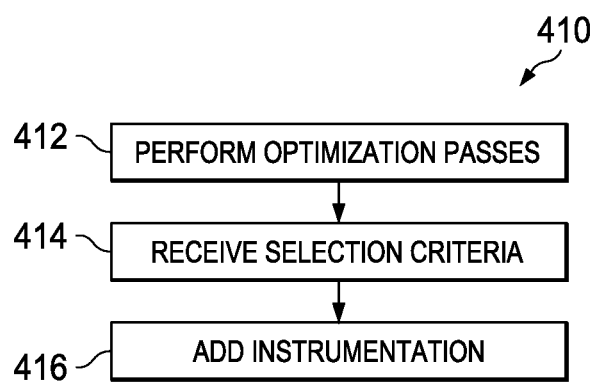
FIG. 12 illustrates a flowchart for an embodiment method of inserting instrumentation into source code.

FIG. 12 illustrates flowchart 410 for a method of applying instrumentation to the code during compilation. Initially, in step 412 optimization passes are performed on source code. For example, LLVM optimization is performed. In one example, the optimization passes are performed before the instrumentation is applied to the source code. Some or all of the optimization passes may be performed before the instrumentation is applied.

In step 414, selection criteria is received. For example, selection criteria may be received from a user. The selection criteria may include specific items to be instrumented. Alternatively, the selection criteria include specific items not to be instrumented. In another example, the selection criteria indicate that all items should be instrumented. The amount of instrumentation may be adjusted based on the user's requirements.

Finally, in step 416, instrumentation is inserted into the source code. The instrumentation is inserted to track cache line accesses. In one example, both read accesses and write accesses are tracked. Alternatively, only write accesses are tracked.

An embodiment data structure used to track cache invalidations is a two entry cache status table which tracks accesses for the cache lines. There may be one table per cache line. This table maintains the access history for the cache lines. The entries contain a thread identification number (ID) and an access type (read access or write access). The fields are used to update the table with new access.

Figure 13:
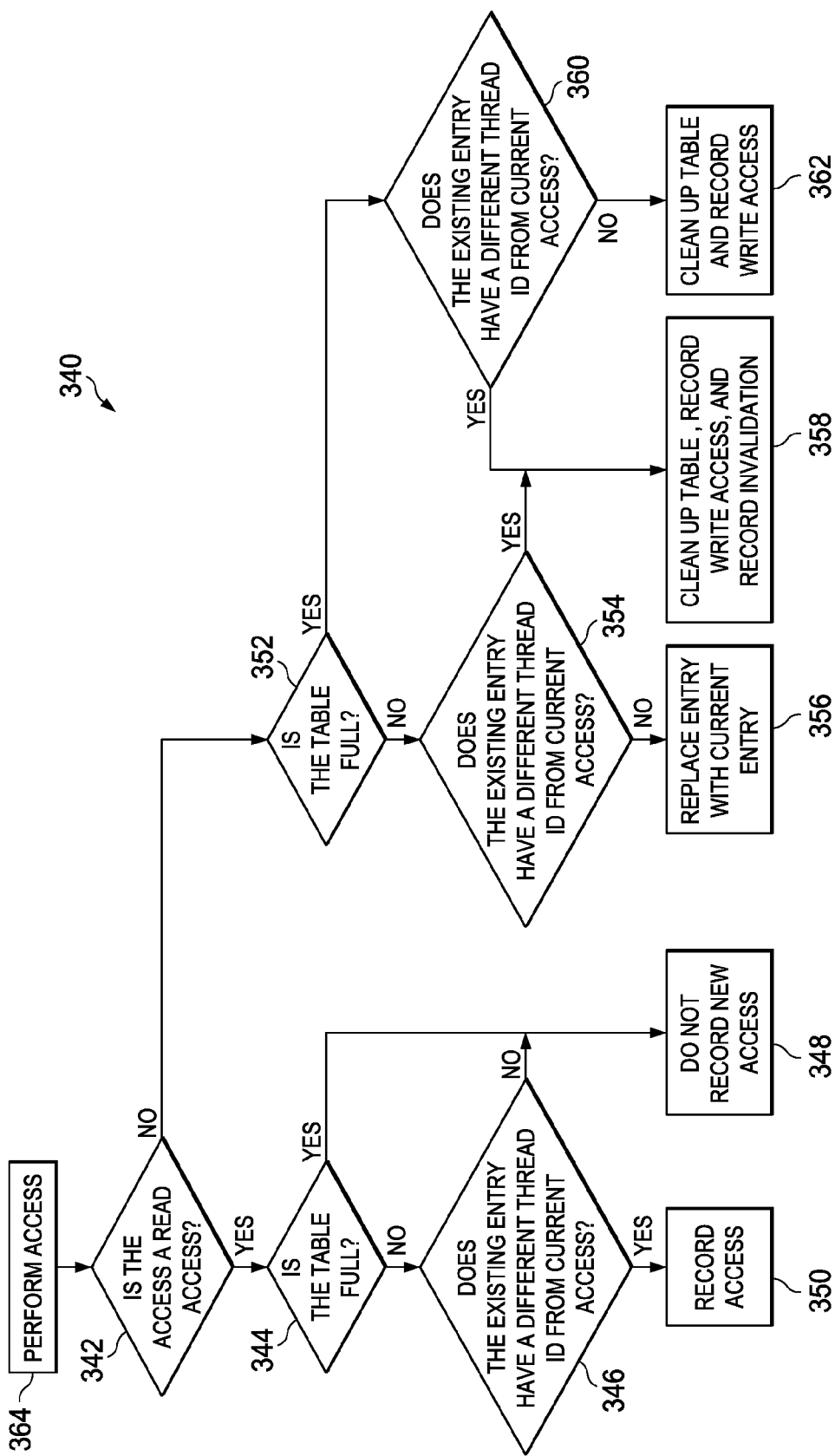
FIG. 13 illustrates a flowchart for an embodiment method of tracking invalidations.

Global variables or heap objects on cache lines with a large number of cache invalidations may be reported. FIG. 13 illustrates flowchart 340 for a method of updating a table for tracking accesses for a cache line. This may be performed for each cache line. Initially, in step 364, an access is performed. The access is either a read access or a write access. The access time is determined.

Next, in step 342, the system determines whether the access is a read access. When the access is a read access, the system proceeds to step 344. When the access is a write access, the system proceeds to step 352.

In step 344, the system determines whether the table is full. When the table is full, the system proceeds to step 348, where it does not record the new access. When the table is not full, the system proceeds to step 346.

The system determines whether the existing entry has a different thread ID from the current access in step 346. The system compares the thread ID of the entry to the thread ID of the access. When the existing entry has a different thread ID from the current access, the system proceeds to step 350, and records the access. A new entry is recorded to the table. When the existing entry has the same thread ID as the current access, the system proceeds to step 348 and does not record the new access.

Also, in step 352, the system determines whether the table is full. When the table is full, the system proceeds to step 360, and when the table is not full, the system proceeds to step 354.

In step 354, the system determines whether the existing entry has a different thread ID from the thread ID of the current access. When the thread IDs are the same, the system replaces the entry in the table with the current access in step 356. In this case, there is no invalidation. When the thread ID in the table is different from the thread ID of the access, the system proceeds to step 358. In step 358, the system cleans up the table, writes the new access, and records an invalidation.

In step 360, the system determines whether the existing entry has a different thread ID from the thread ID of the access. When the thread IDs are the same, the system proceeds to step 362. In step 362, the system cleans up the table and records the write access. However, there is no invalidation. When the thread IDs are different, there is an invalidation, and the system proceeds to step 358, where the table is cleaned up, a write access is recorded, and an invalidation is recorded.

After the number of cache invalidations for the cache lines is determined, the seriousness of false sharing for the cache lines is ranked. Cache lines with more cache invalidations are more likely to have a false sharing problem, which may degrade performance.

Figure 14A:
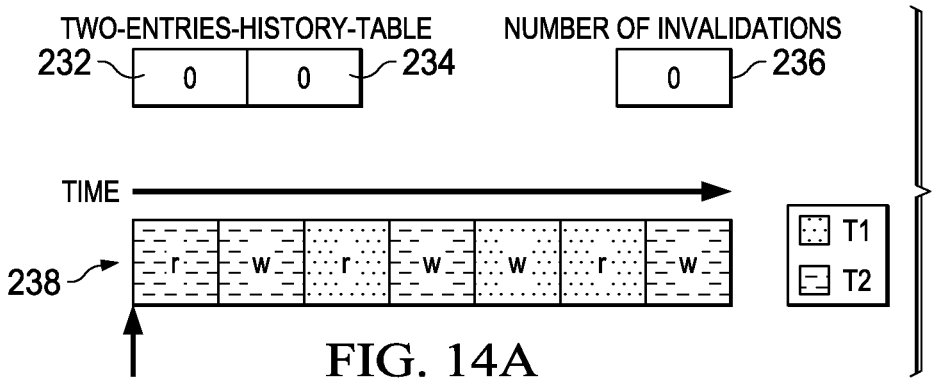
FIGS. 14A-F illustrate invalidation tracking.

FIGS. 14A-F illustrate the tracking of invalidations for two threads, thread 1 (T1), and thread 2 (T2). The threads run on separate cores, each with a corresponding separate private cache. Infinite cache capacity is assumed. The hardware cache is mimicked at the software level. FIG. 14A illustrates two entries in a table, entry 232 and entry 234. Initially, these entries are both set to zero. The number of invalidations is also tracked in entry 236. The number of invalidations is initially set to zero. A time sequence of read and write accesses to memory is in sequence 238.

Figure 14B:
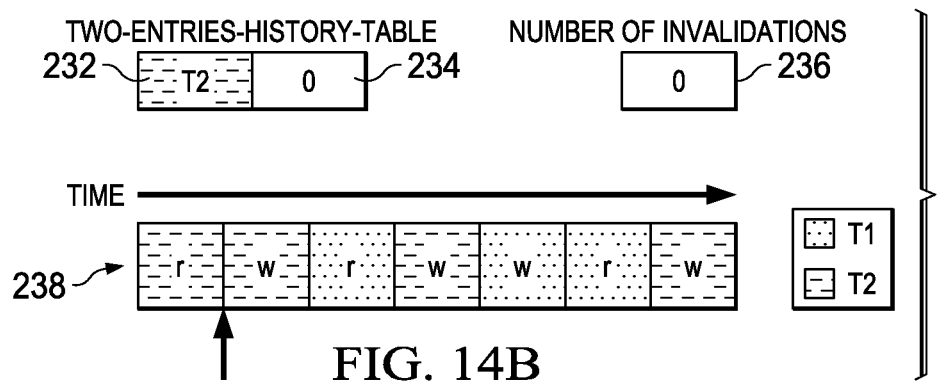

Shown by FIG. 14B, thread 2 reads from the cache line. Thread 2 is then saved in entry 232, indicating that thread 2 has accessed the cache line. Entry 234 and entry 236 remain zero.

Figure 14C:
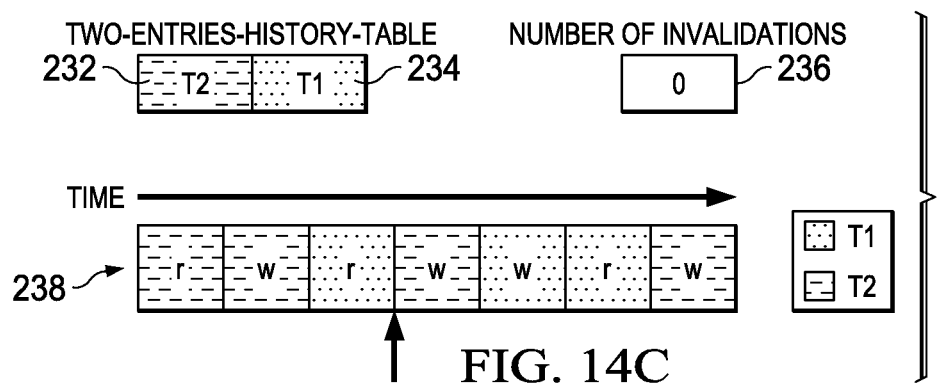

Next, illustrated by FIG. 14C, thread 2 writes to the cache line. After thread 2 writes to the cache line, thread 1 reads from the cache line. Entry 234 is set to T1, indicating that T2 has accessed the cache line. Entry 236, the number of invalidations, is still zero.

Figure 14D:
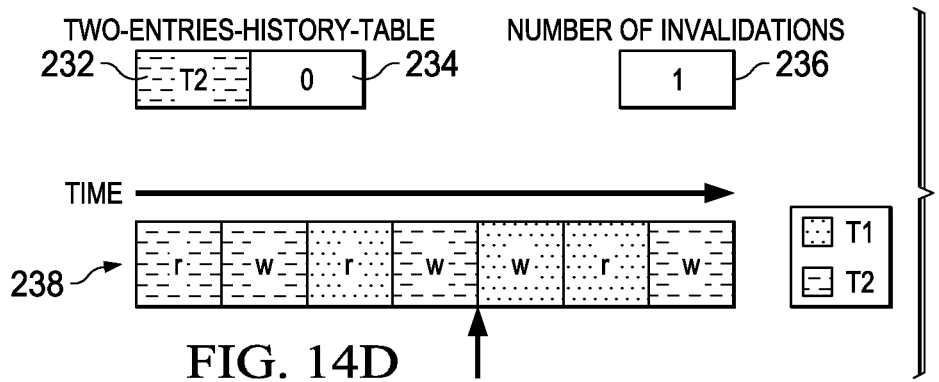

In FIG. 14D, thread 2 then writes to the cache line. The table is cleared, an invalidation is recorded, and the write access is recorded. Entry 234 is set to 0, and the number of invalidations, entry 236, is set to 1.

Figure 14E:
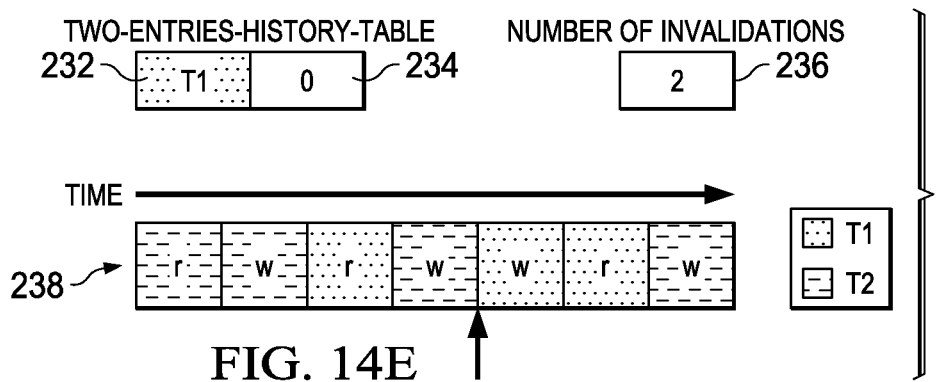

Then, thread 1 writes to the cache line in FIG. 14E. Entry 232 is set to T1, the number of invalidations is set to 2, and entry 234 remains zero.

Figure 14F:
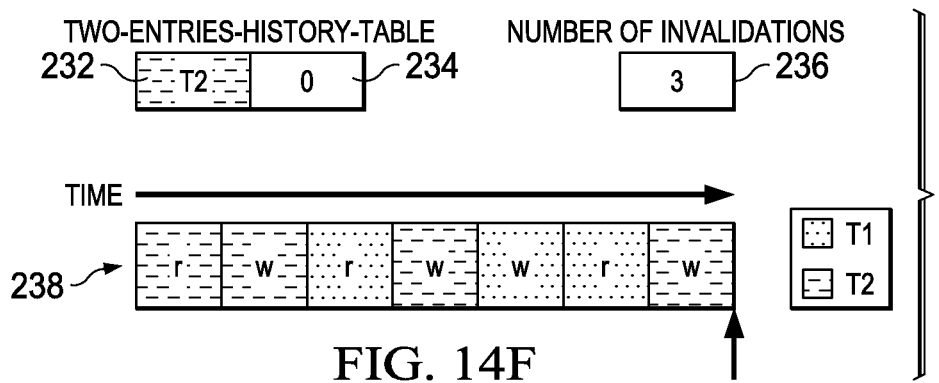

Next, thread 1 reads from the cache line, and there is no change to entries 232, 234, and 236. Finally, as illustrated by FIG. 14F, thread 2 writes to the cache line. The number of invalidations is increased to 3. Also, entry 232 is set to T2. Entry 234 remains 0.

In one example, a threshold for the number of write accesses is used to determine whether there is a high risk of false sharing. When the number of write accesses on a cache line is above a predefined threshold, the read and write accesses are tracked for each word in the cache line. Thread read or write accesses on a word, and the number of total accesses, may be tracked. This information may differentiate true sharing from false sharing. Also, the location of the problem may be determined. Using a threshold may reduce the overhead by only tracking details when there is an increased risk of false sharing.

After cache lines with a large number of cache invalidations are detected, actual false sharing is differentiated from true sharing. In true sharing, multiple threads update the same counter in the cache lines, which cause a large number of cache invalidations.

The access information for the words in cache lines involved in false sharing is tracked. The number of read and/or write accesses to the words by is tracked by thread. When a word is accessed by multiple threads, the origin of this word is marked as a shared access. The word is marked as do not track for further accesses. This information facilitates distinguishing false sharing from true sharing in the reporting phase. Also, the information helps diagnose where actual false sharing occurs when there are multiple fields or multiple objects in the same cache line. This may reduce the effort to fix false sharing problems.

To report the origins of heap objects with false sharing problems, callsite information for heap objects is maintained. Source code level information for the heap objects may be reported. To obtain callsite information, memory allocations and de-allocations are intercepted. For example, the backtrace( ) function in the glibc library is used to obtain the whole callsite stack. False positives may be avoided by updating recording information at memory de-allocations for objects without false sharing problems. Heap objects involved in false sharing are not reused.

For accesses, the corresponding cache line's metadata is looked up to obtain detailed information or to update access counters. In one example, a shadow memory mechanism is used to store metadata for pieces of application data. Thus, corresponding metadata is directly computed and located based on address arithmetic.

To support shadow memory, a predefined starting address and fixed size for a heap may be used. A custom memory allocator is used, which may use a per-thread-heap mechanism. In the allocator, memory allocations from different threads do not occupy the same physical cache line, which automatically avoids false sharing among different objects.

In one embodiment, a threshold based tracking mechanism is used. Because cache invalidations are the root cause of performance degradation, and only write accesses introduce cache invalidations, cache lines with a small number of writes are unlikely to be a significant performance bottleneck. In one example, cache invalidations are tracked once the number of write accesses to a cache line crosses a pre-defined threshold, known as a tracking threshold. Before the threshold is reached, only the number of write accesses on a cache line is tracked, while read accesses are not tracked.

FIG. 15 illustrates flowchart 390 for a threshold based tracking mechanism. In step 392, the system determines whether the number of write accesses is greater than or equal to the tracking threshold. When the number of write accesses is greater than or equal to the tracking threshold, the system proceeds to step 396 to track detailed information. However, when the number of writes is less than the tracking threshold, the system continues to track only the number of write accesses in step 394.

In one example, two arrays on shadow memory are maintained. CacheWrites tracks the number of memory writes on cache lines, and CacheTracking tracks detailed information on cache lines when the number of writes on a cache line exceeds the tracking threshold. When the threshold is not reached, CacheTracking is not used. Example pseudocode 380 is illustrated in FIG. 16.

When the number of write accesses on a cache line is greater than the tracking threshold, accesses are tracked to store details such as word access information, update access counter, and the cache access history table for the cache line. When a cache line is involved in false or true sharing, updating those counters exacerbates the impact of false sharing on performance. Not only is there an invalidation on an application cache line, but there is also at least one other cache invalidation caused by updating the metadata of the corresponding cache lines. To reduce performance overhead, an embodiment only samples the first specified number of accesses of a sampling interval for tracked cache lines. In one example, there is an access counter for each cache line, but only the first 10,000 accesses of every million accesses on a cache line is tracked, for a 1% sampling rate. Different sampling rates do not negatively impact effectiveness.

An embodiment may provide suggestions for fixing false sharing problems based on the memory trace information is provided. This may reduce the manual overhead of fixing false sharing problems.

Different inputs may cause different executions of a program. When a specific input does not exercise a portion of the code with false sharing problems, that false sharing problem is not detected. However, inputs may be generalized over to find latent false sharing problems on those exercised codes. When a reasonably representative set of inputs are exercised, false sharing may be effectively detected.

Input size may affect detection results. An embodiment introduces several threshold values to reduce the tracking overhead, which may be adjusted based on actual detection environments. When the input size is sufficiently small that it cannot generate enough false sharing events to pass the pre-defined thresholds, the detection mechanism may not be triggered. However, a larger input size may trigger the mechanism.

Memory hierarchy of the underlying machine does not affect the detection results. An embodiment does not attempt to obtain the actual cache invalidations of a program, which may depend on real memory hierarchy. Thus, an embodiment does not bind to a specific machine, providing good generality.

Figure 17:
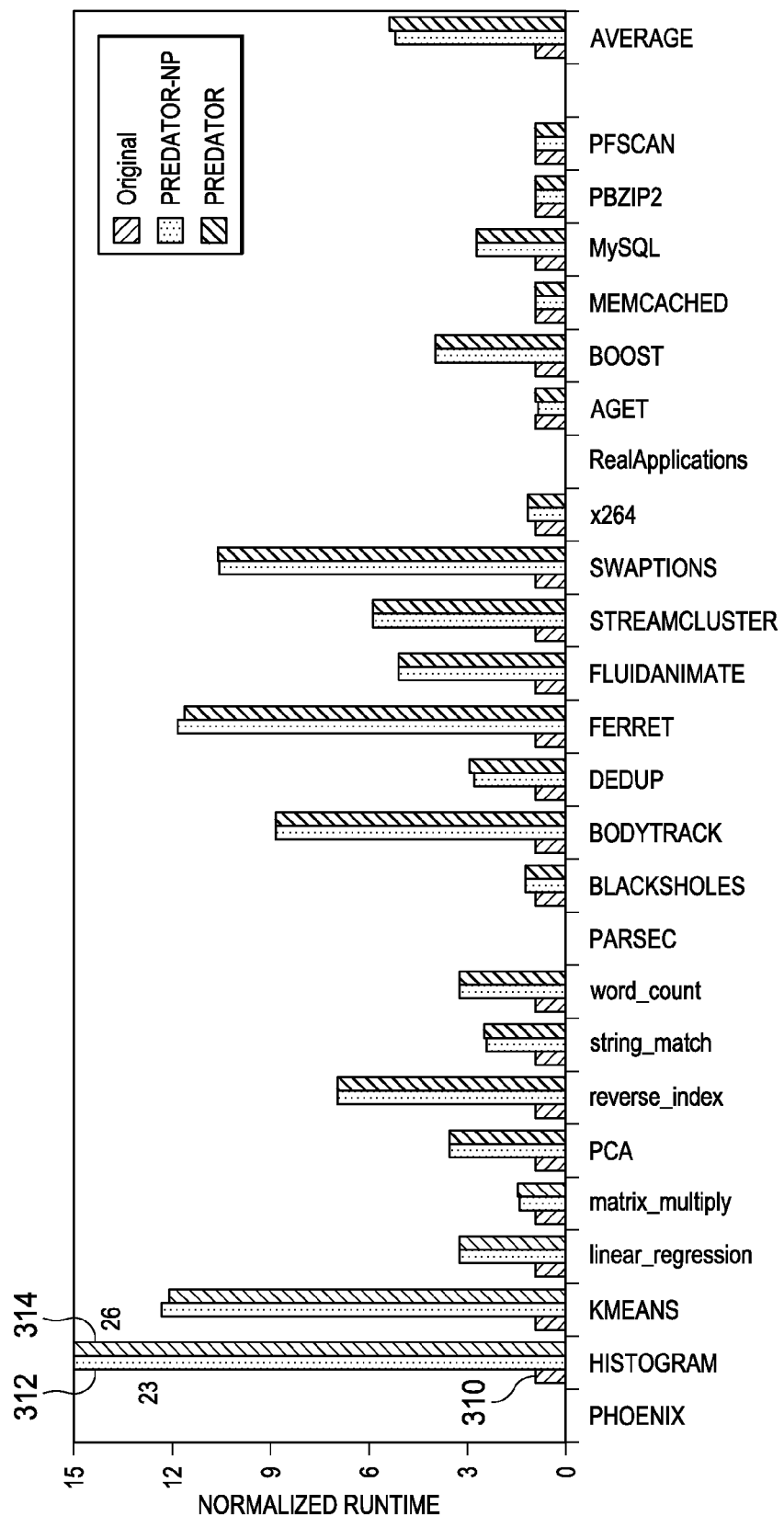
FIG. 17 illustrates a graph of performance overhead.

FIG. 17 illustrates a graph of the overhead performance of predator using normalized runtime. Bars 310 shows the baseline, bars 312 shows predator non-prediction (NP), and bars 314 shows predator. Predator has a performance overhead of about six times. For 16 benchmarks, predator imposes a 5.4 times performance overhead. Five programs, histogram, kmeans, bodytrack, ferret, and swaptions have more than an 8 times performance overhead. The histogram benchmark runs more than 26 times slower than the original executions with pthreads library, because tracking detailed access on cache lines with false sharing exacerbates false sharing. For bodytrack and ferret, although there is no false sharing, predator detects a large amount of cache lines with writes larger than tracking threshold. Thus, tracking those accessing details for those cache lines imposes performance overhead. Predator imposes a small performance overhead for input-output (IO)-bound applications such as matrix_multiply, blackscholes, x264, aget, Memcached, pbzib2, and pfscan, because predator does not add any performance overhead for IO operations.

Figure 18:
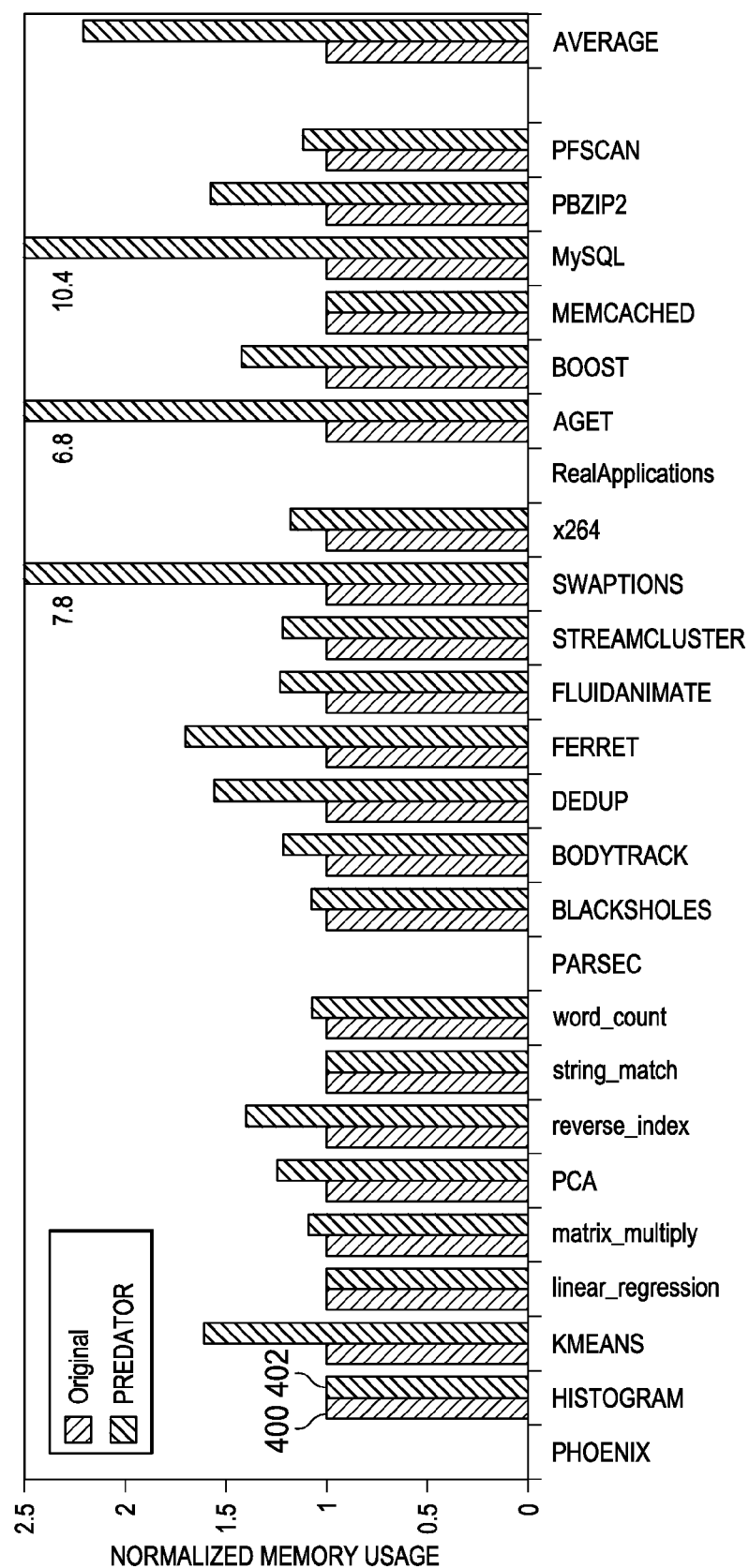
FIG. 18 illustrates a graph of memory usage overhead.

FIG. 18 illustrates the memory usage using normalized memory usage. Bars 400 shows the baseline and bars 402 shows the memory usage for predator. Predator imposes less than 50% memory overhead for 17 out of 22 applications. For swaptions and aget, predator introduces more memory overhead, because the original memory footprints are very small at only 3 kilobytes. Adding the code of detection, prediction, and reporting contributes to a large ratio of memory overhead. Although the average memory usage of applications is over two times, the total memory usage overhead is only about 40% on predator.

Figure 19:
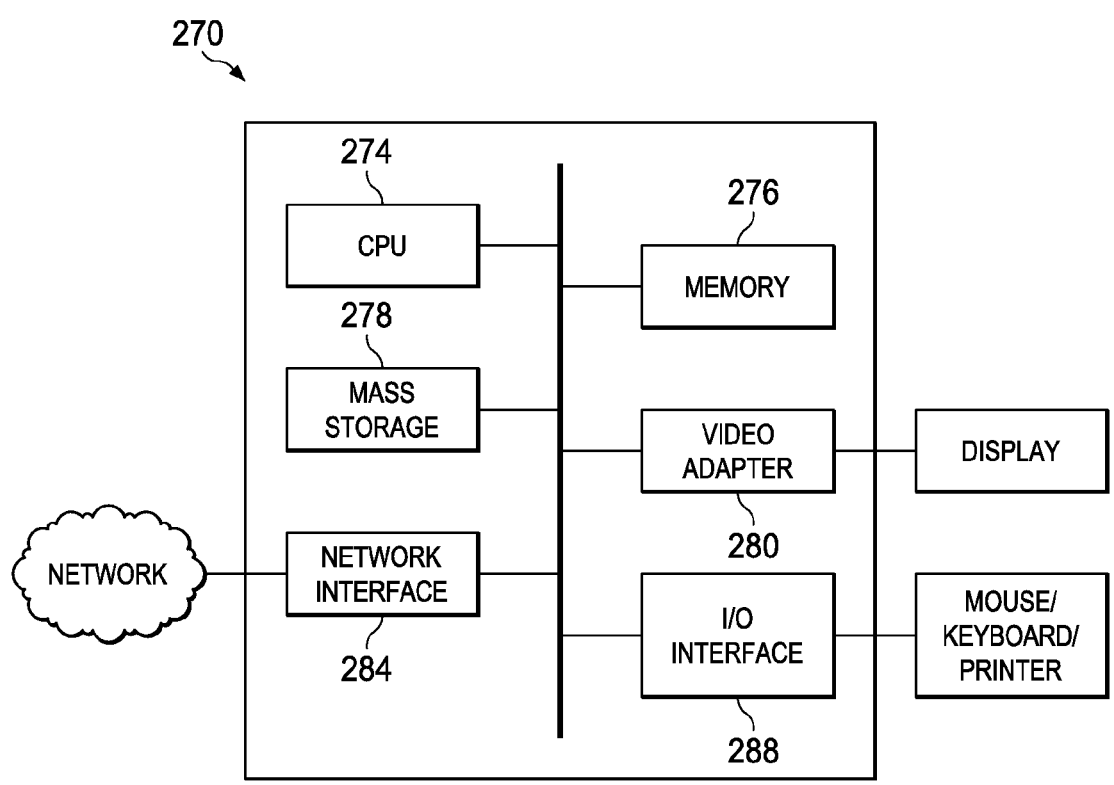
FIG. 19 illustrates a block diagram of an embodiment general-purpose computer system.

FIG. 19 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for detecting false sharing, the method comprising:
    running code on a plurality of cores, wherein the code comprises a first instrumentation, and wherein running the code on the plurality of cores comprises:
        fetching, by a first core of the plurality of cores from a main memory, a first cache line;
        storing the first cache line in a first cache of a plurality of cache lines;
        fetching, by a second core of the plurality of cores from the main memory, a second cache line; and
        storing the second cache line in a second cache of the plurality of cache lines;
    tracking cache invalidations in the code while running the code to produce tracked invalidations in accordance with the first instrumentation, wherein tracking the cache invalidations comprises:
        tracking a number of write accesses to the plurality of cache lines;
        determining whether to track cache accesses to the plurality of cache lines in accordance with the number of write accesses; and
        tracking cache accesses to the plurality of cache lines by a plurality of tasks in response to determining to track cache accesses; and
    reporting false sharing in accordance with the tracked invalidations to produce a false sharing report.

2. The method of claim 1, further comprising inserting a second instrumentation into the code.

3. The method of claim 1, wherein reporting the false sharing comprises reporting a name of a global variable, an address of the global variable, and a size of the global variable.

4. The method of claim 1, wherein reporting the false sharing comprises reporting a callsite stack for an allocation of a heap object, an address of the heap object, and a size of the heap object.

5. The method of claim 1, wherein reporting the false sharing comprises reporting a plurality of words of a cache line of the plurality of cache lines, a first task of the plurality of tasks, and a second task of the plurality of tasks, wherein the first task accesses a first word of the cache line and the second task accesses a second word of the cache line.

6. The method of claim 1, further comprising diagnosing the false sharing in accordance with the false sharing report.

7. The method of claim 1, wherein reporting the false sharing comprises determining whether an invalidation of the tracked invalidations indicates false or true sharing.

8. The method of claim 1, wherein reporting the false sharing comprises examining metadata corresponding to a cache line of the plurality of cache lines.

9. The method of claim 1, determining whether to track cache accesses to the plurality of cache lines comprises:
    comparing the number of write accesses to a threshold; and
    determining to track cache accesses to the plurality of cache lines in response to determining that the number of write accesses is greater than the threshold.

10. The method of claim 1, wherein tracking the cache invalidations comprises sampling cache accesses.

11. The method of claim 1, wherein tracking the cache invalidations comprises:
    performing an access having an access thread identification number (ID) to a word of a cache line of the plurality of cache lines;
    determining whether the access is a read access or a write access;
    determining whether the access thread ID is the same as a table thread ID of a table; and
    recording an invalidation when the access is a write access and the access thread ID is not the same as the table thread ID.

12. The method of claim 11, further comprising:
    determining whether the table is full; and
    recording the access when the access is a write access or is a read access, the table is not full, and the table thread ID is not the same as the table thread ID.

13. The method of claim 12, wherein recording the access comprises:

recording whether the access is a read access or a write access; and recording the access thread ID.

14. The method of claim 11, further comprising cleaning up the table when the access is a write access and the table is full, or when the access thread ID is the same as the table thread ID.

15. The method of claim 1, further comprising:

performing a plurality of optimization passes on source code;

receiving selection criteria; and adding a second instrumentation to the source code after performing the plurality of optimization passes to produce an instrumented code, wherein the second instrumentation is configured to track memory access addresses and access types of global variables and heap variables in accordance with the selection criteria.

16. The method of claim 15, wherein adding the second instrumentation into the source code comprises inserting the second instrumentation for read accesses and write accesses.

17. The method of claim 15, wherein adding the second instrumentation into the source code comprises inserting the second instrumentation for write accesses and not inserting the second instrumentation for read accesses.

18. The method of claim 15, wherein the selection criteria comprises a black list of items not to be instrumented.

19. The method of claim 15, wherein the selection criteria comprises a red list of items to be instrumented.

20. A computer comprising:

a main memory;

a first cache;

a first processor coupled to the main memory and to the first cache;

a second cache;

a second processor coupled to the main memory and to the second cache; and a non-transitory computer readable storage medium storing programming for execution by the first processor and the second processor, wherein the programming comprises instrumentation, the programming including instructions to:

fetch, by the first processor from the main memory, a first cache line of a plurality of cache lines, store the first cache line in the first cache of the plurality of cache lines, fetch, by the second processor from the main memory, a second cache line of the plurality of cache lines, store the second cache line in the second cache, track cache invalidations in the programming while running the programming to produce tracked invalidations in accordance with the instrumentation, wherein the instructions to track the cache invalidations comprises instructions to:

track a number of write accesses to the plurality of cache lines, determine whether to track cache accesses to a plurality of cache lines in accordance with the number of write accesses, and track cache accesses to the plurality of cache lines by a plurality of tasks in response to determining to track cache accesses, and report false sharing in accordance with the tracked invalidations to produce a false sharing report.

* * * * *

UNITED STATES PATENT AND TRADEMARK OFFICE
CERTIFICATE OF CORRECTION

PATENT NO. : 9,678,883 B2
APPLICATION NO. : 14/335621
DATED : June 13, 2017
INVENTOR(S) : Tongping Liu It is certified that error appears in the above-identified patent and that said Letters Patent is hereby corrected as shown below:

In the Claims

In Column 14, Line 40, Claim 9, delete "claim 1, determining" and insert --claim 1, wherein determining--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*